United States Patent
Taniguchi

[19]

[11] Patent Number: 6,014,035
[45] Date of Patent: Jan. 11, 2000

[54] TEST SYSTEM AND TEST METHOD FOR LIQUID CRYSTAL DISPLAY DEVICE

[75] Inventor: Yoshiyuki Taniguchi, Shiga-ken, Japan

[73] Assignee: International Business Machines Corporation, Armonk, N.Y.

[21] Appl. No.: 09/038,570

[22] Filed: Mar. 11, 1998

[30] Foreign Application Priority Data

Jul. 11, 1997 [JP] Japan .................................. 9-186792

[51] Int. Cl.[7] .................................................. G01R 31/02
[52] U.S. Cl. ......................................... 324/770; 324/73.1
[58] Field of Search ................................... 324/73.1, 770, 324/719

[56] References Cited

U.S. PATENT DOCUMENTS

| | | | |
|---|---|---|---|
| 5,576,730 | 11/1996 | Shimada | 324/770 |
| 5,694,053 | 12/1997 | Smith | 324/770 |
| 5,696,550 | 12/1997 | Aoki | 374/770 |

*Primary Examiner*—Josie Ballato
*Assistant Examiner*—Jose M. Solis

*Attorney, Agent, or Firm*—Scully, Scott, Murphy & Presser; Jay P. Sbrollini

[57] ABSTRACT

The present invention is directed to a new test system by which an electric test and an optical test for a liquid crystal display device, such as a liquid crystal panel, can be performed at the same time and under the same conditions, and to enhancing the test accuracy and the test efficiency.

More particularly, the present invention is directed to a test system for a liquid crystal display device comprising: an optical controller 1 for supplying a control signal to a gate line and a data line of a liquid crystal panel 6 that is to be examined; an electric charge measurement unit 2 for measuring pixel capacitances of pixels in one frame of the liquid crystal panel 6; a test switching unit 3 for, in response to a test start signal instructing that the electric test be started, connecting the data line of the liquid crystal panel 6, which has connected to the optical controller 1, to the electric charge measurement unit 2 during a period equivalent to one frame; an image processor 4 for performing image processing for the electric charge value measured by the electric charge measurement unit 2; and a display unit 5 for displaying the resultant image.

7 Claims, 3 Drawing Sheets

PRIOR ART

TEST SYSTEM AND TEST METHOD FOR LIQUID CRYSTAL DISPLAY DEVICE

BACKGROUND OF THE INVENTION

1. Technical Field

The present invention relates to a test system having both an electric test function and an optical test function for testing a liquid crystal display device, such as a liquid crystal panel, and a test method therefor.

2. Prior Art

As is shown in a flowchart in FIG. 1, a liquid crystal panel is fabricated in a substrate forming process, an array forming process, a cell forming process and a module forming process. Generally, in this fabrication processing series, an electric test, called an array test, is conducted at the final stage of the array forming process, and a cell optical test is conducted at the final stage of the cell forming process. As the electric test in the array forming process, a TFT array test or an open short circuit test is commonly performed. According to the TFT array test, an electric charge writing voltage is applied to a data line and a voltage is applied to a scan line, so that electric charges are written to a pixel capacitor to be tested. When a predetermined period of time has elapsed, the electric charges at the test target are measured using a probe. Using the measured values of the electric charges, signal line short circuits, line breaks and defective pixels can be found. According to the open short circuit test, a voltage is applied alternatively to a scan line and a data line, and signal line short circuits, line breaks, and line intersection short circuits can be found.

For the optical test in the cell forming process, a liquid crystal panel wherein a cell is formed and into which liquid crystal is injected is turned on and the operational state of the panel is examined. Specifically, a drive signal for displaying an image pattern, such as a raster image, vertical strips, horizontal stripes or a box pattern, is transmitted to a data line terminal and a scan line terminal, and defective pixels, an even image color or an image contrast is visually examined.

The optical test is performed only for a liquid crystal panel that is regarded as good following the electric test. In other words, since a liquid crystal panel having poor electric characteristics would be eliminated by the electric test that is performed prior to the optical test, it would not be a target for the optical test. Theoretically, therefore, it can be ascertained that liquid crystal panel defects found by the optical test are the results of problems that occur during the cell forming process, such as dust entering a liquid crystal cell when it is sealed or the occurrence of scratches. However, when the reason for the failure of a defective panel found by the optical test is analyzed, it is found that the reason the failure occurred is not always dust or scratches, and the cause may be by the electrical characteristics of a pixel capacitor. It is felt that although originally electric characteristics are detected at the electric test, the reason that such a failure is found during the optical test is that it is caused by a device used for the test, the test method or differences in the testing conditions.

The pixel defect for an ON point or an OFF point that is to be examined at the optical test can be caused by a signal line short circuit, a line break or a pixel capacitor failure, or by the entry of dust or by scratches acquired during the cell forming process. However, since visually a defect caused by either failure has the same appearance, the cause of the defect can not be identified merely through visual observation. For this reason, both an electric testing device and an optical testing device must be employed to analyze a failure and to determine its cause, and such an analysis of a failure provides results that are very inadequate.

SUMMARY OF THE INVENTION

Accordingly, it is an object of the present invention to provide a new test system that provides for the performance of an electric test and an optical test by a single device.

It is another object of the present invention to conduct an electric test and an optical test under the same conditions so as to improve test accuracy and test efficiency.

More specifically, the present invention is directed to a test system for a liquid crystal display device comprising: signal supply means for supplying a control signal to a gate line and a data line of the liquid crystal display device that is to be examined; measurement means for measuring capacitances of pixels in one frame of the liquid crystal display device; and switching means for, in accordance with a test start signal input, connecting the data line of the liquid crystal display device, which is connected to the signal supply means, to the measurement means during a one frame period.

Display means for displaying a measurement result of the capacitances of the pixels in one frame, obtained by the measurement means, may be additionally provided for the above arrangement.

The signal supply means may prepare a plurality of image patterns, and may transmit, to the gate line and the data line, a control signal for displaying a designated image pattern on the liquid crystal display device.

The present invention is further directed to a test method for a liquid crystal display device comprising the steps of: supplying a control signal to be executed to a gate line and a data line of the liquid crystal display device; halting, in accordance with a test start signal input, a supply of the control signal to the data line of the liquid crystal display device during a one frame interval; and measuring capacitances of pixels in one frame of the liquid crystal display device during the one frame interval.

A step of displaying a result of a measurement of the capacitances of the pixels in one frame may be further provided.

The step of supplying the control signal may include a step of turning on the liquid crystal display device and examining an ON state of the liquid crystal display device. In this case, it is preferable that a plurality of image patterns to be prepared in advance, and that a designated image pattern be displayed on the liquid crystal display device.

According to the present invention, a control signal is supplied to the gate line and to the data line of a liquid crystal display device. When the liquid crystal display device is assembled so that it can be turned on, it is turned on upon the receipt of a control signal. An inspector examines the ON state to find defective pixels and uneven colors. Since, during a one frame period, the supply of a control signal is halted in the ON state and the pixel capacitances for one frame are examined, the electric test can be performed in conjunction with the optical test.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
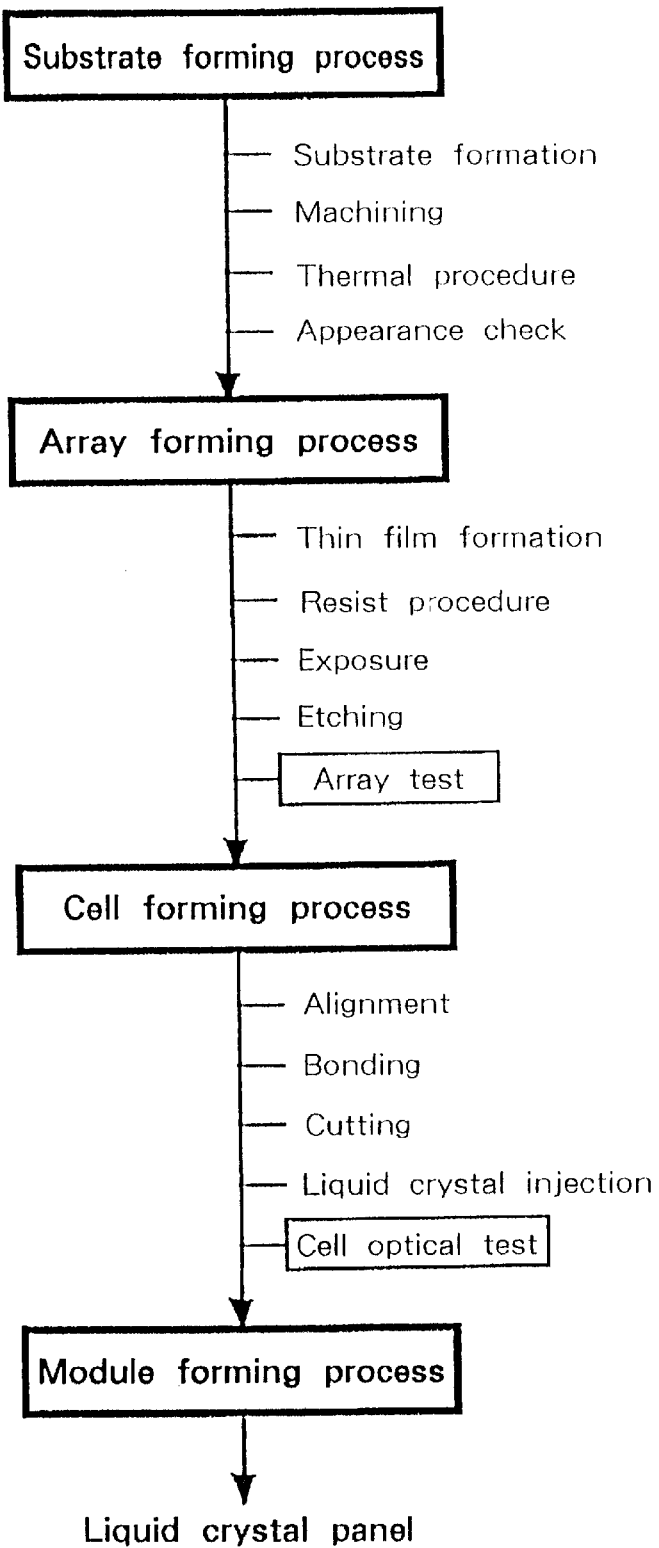
FIG. 1 is a flowchart showing the fabrication process for a general liquid crystal panel.
Figure 2:
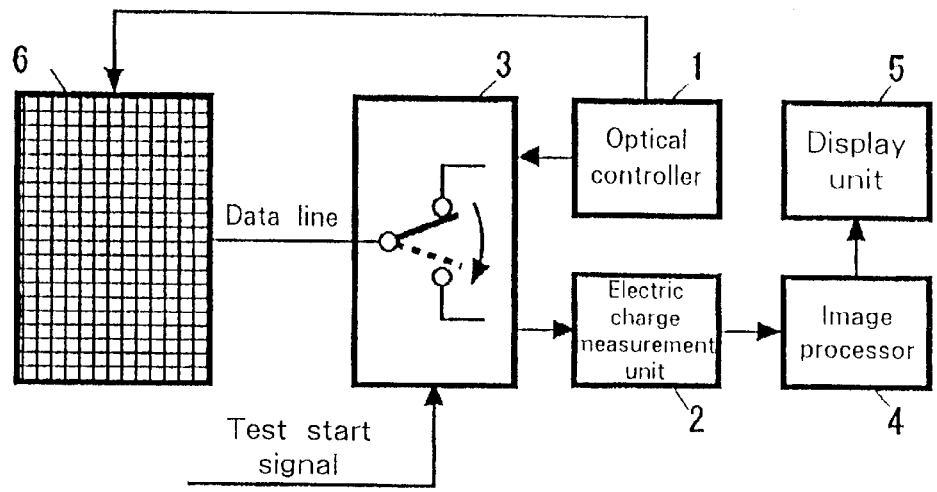
FIG. 2 is a block diagram illustrating a test system for a liquid crystal panel according to one embodiment of the present invention.

Fig.2 is a block diagram illustrating a test system for a liquid crystal panel according to one embodiment of the present invention. The test system comprises an optical controller 1, serving as signal supply means; an electric charge measurement unit 2; a test switching unit 3; an image processor 4; and a display unit 5. First, a data line of a liquid crystal panel 6 to be tested is connected to the test switching unit 3, and its gate line is connected to the optical controller 1. The test switching unit 3 is so set that the data line is connected to the optical controller 1. The optical controller 1 transmits a control signal to the gate line and the data line of the liquid crystal panel 6, and turns the liquid crystal panel on. That is, electric charges are accumulated in the pixel capacitor of the liquid crystal panel 6. Since the liquid crystal panel 6 is in the ON enabled state when the cell forming process is terminated, it is turned on upon the receipt of the control signal. Therefore, the ON state can be visually examined and the optical test for the pixel defects, such as an ON point and an OFF point, an uneven image color and a contrast, can be conducted.

Following this, to begin the electric test, a test start signal is supplied to the test switching unit 3. The test switching unit 3 employs the test start signal as a trigger to connect the data line of the liquid crystal panel 6 to the electric charge measurement unit 2 during a one frame period. The one frame period constitutes a period during which one frame is displayed on the liquid crystal panel 6. When 30 frames are to be displayed in one second, one frame period is equivalent to 1/30 second (about 16 ms). When the data line of the liquid crystal panel 6 is connected to electric charge measurement unit 2, the supply to the data line of a control signal from the optical controller 1 is halted. During the one frame period, the electric charge measurement unit 2 measures the pixel capacitances of the pixels for one frame in the liquid crystal display device. When the time for one frame period has elapsed, the test switching unit 3 again connects the data line to the optical controller 1. It should be noted that, although the liquid crystal panel 6 is in the ON disabled state during a one frame period, such a state can not be acknowledged visually and the panel 6 appears to be ON constantly.

The capacitances of multiple pixels constituting one frame are measured by the electric charge measurement unit 2, and the measured values are transmitted to the image processor 4. The image processor 4 analyzes the measured values to obtain the electric characteristics, such as a short circuit of the signal line, a line break or an inadequate pixel capacitance. All of the measured pixel capacitances for one frames are replaced by a pseudo-liquid crystal panel image of 256 gray scales, which is then displayed on the display unit 5. Where the measured pixel capacitances exceed a predetermined threshold value, marks are added at the pertinent display locations.

The pseudo-liquid crystal panel image displayed on the display unit 5 is visually compared with the actual ON state of the liquid crystal panel 6. From differences between the two display images, the cause of the failure of a specific pixel can be determined as follows. Since the result obtained by performing image processing for the display image is compared with the result obtained by performing image processing for the electric charges of each pixel, the optical test and the electric test can be performed at the same time and under the same conditions.

| Actual ON state (optical test) | Pseudo LCD image (electric test) | Cause of failure |
| --- | --- | --- |
| NG | OK | Failure in cell forming process (dust, scratches) |
| NG | NG | Failure in array forming process |

Furthermore, an image pattern to be displayed on the liquid crystal panel 6 may be changed to perform the optical test and the electric test again. In this case, a plurality of image patterns is prepared in advance and is stored in the optical controller 1, and a control signal for displaying a designated image pattern to the liquid crystal panel 6 is transmitted to the gate line and the data line. The image patterns are a raster pattern, vertical stripes, horizontal stripes and a box pattern.

Figure 3:
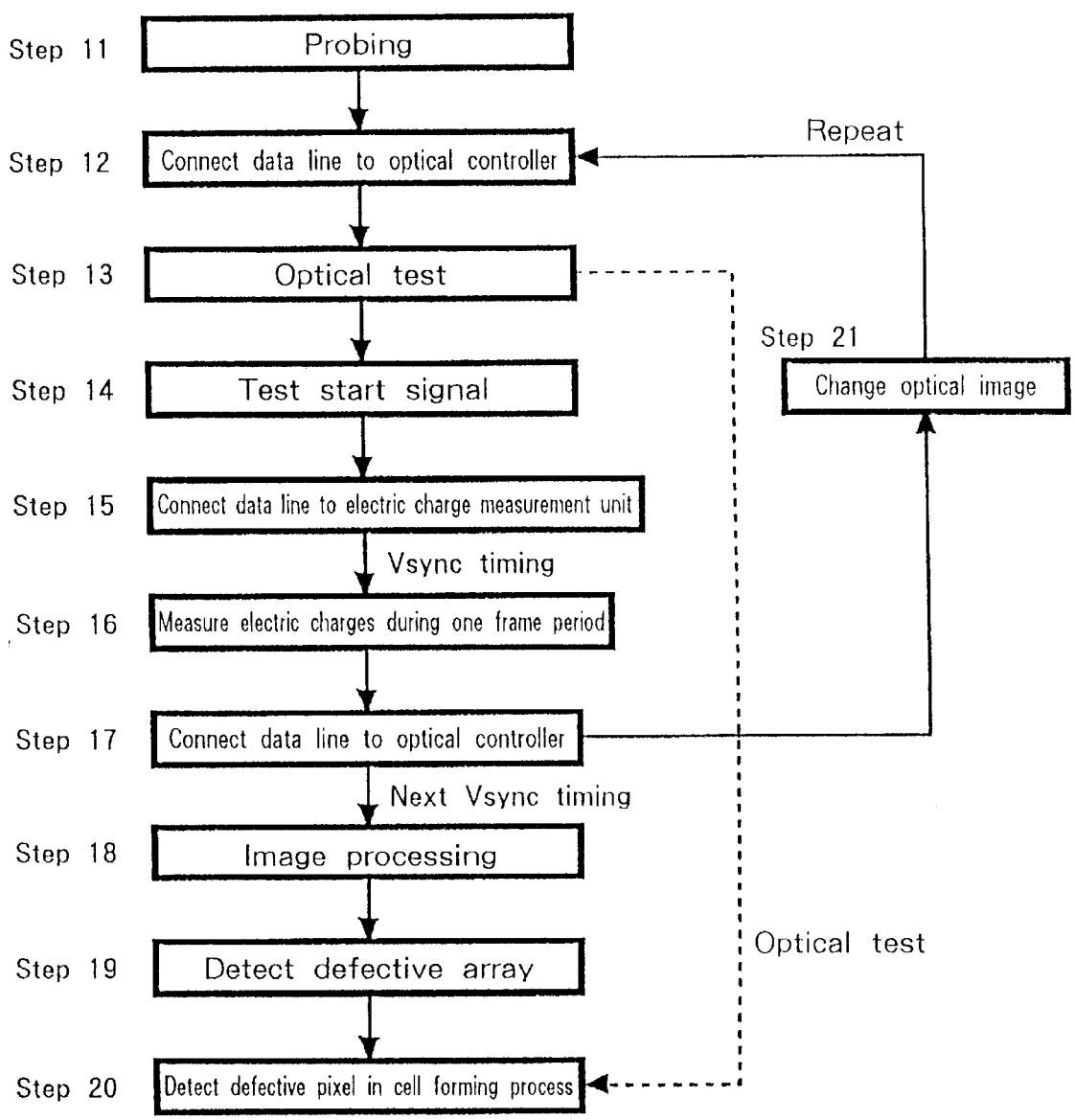
FIG. 3 is a flowchart for performing a final cell test.

FIG. 3 is a flowchart for conducting a final cell test. First, the above described test system is connected to the liquid crystal panel 6 (step 11). The test switching unit 3 switches to the optical controller 1 side to connect the data line of the liquid crystal panel 6 to the optical controller 1 (step 12). The optical controller 1 transmits the above described control signai to the liquid crystal panel 6 to turn it on, and performs the optical test for examining the ON state of each pixel in the panel 6 (step 13). When a failure is found as a result of the optical test, the following electric test is performed to pinpoint the cause of the failure.

To begin the electric test, a test start signal is supplied to the test switching unit 3 (step 14). The test switching unit 3 connects the data line of the liquid crystal panel 6 to the electric charge measurement unit 2 during a period equivalent to one frame (step 15). The electric charge measurement unit 2 measures electric charges during the one frame period (step 16). When the time represented by one frame period has elapsed, the test switching unit 3 again switches to the optical controller side 1 (step 17). The image processor 4 performs image processing for the measured electric charge value (step 18). A processed image is displayed by the display unit 5 to visually determine whether or not an electric failure has occurred, i.e., whether or not there is a defective array (step 19). Based on the results of the optical test (step 13) and the defective array detection (step 19), the cause of the failure is specified (step 20).

After the process at step 17, the optical controller 1 changes the image pattern and repeats the optical test and the electric test sequence.

Figure 4:
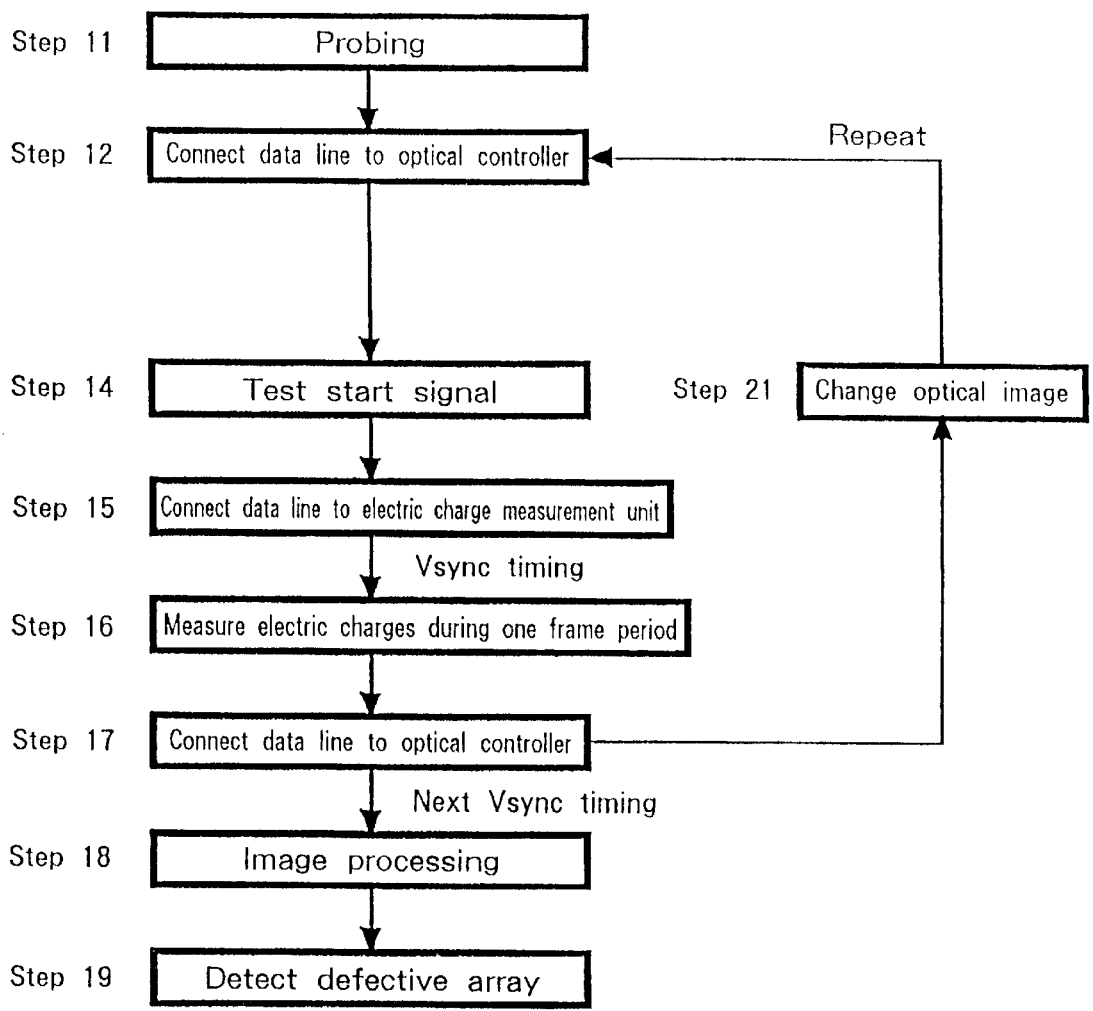
FIG. 4 is a flowchart for performing a final array test.

As is described above, the test system of the present invention can perform both the optical test and the electric test at the same time after the cell forming process is terminated; however, the test system can be employed for the electric test after the array forming process is completed. FIG. 4 is a flowchart for performing the final array test. Since immediately after an array is formed, the liquid crystal panel 6 is not ready to be turned on, the visual optical test is not performed. Therefore, steps 13 and 20 in FIG. 3 are not included in the test processing in FIG. 4, while the other steps are the same as those for the flowchart for the final cell test.

As is described above, according to the present invention, the image optical test and the electric test for the liquid crystal display device can be performed at the same time, in real time, by using a single device. Therefore, the adjustment based on the results of the two tests can be precisely performed, and accordingly, the test accuracy and the test efficiency can be enhanced.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A test system for a liquid crystal display device comprising:

signal supply means for supplying a control signal to a gate line and a data line of said liquid crystal display device that is to be examined;

measurement means for measuring capacitances of pixels in one frame of said liquid crystal display device; and switching means for, in accordance with a test start signal input, connecting said data line of said liquid crystal display device, which is connected to said signal supply means, to said measurement means during a one frame period.

2. The test system according to claim 1, further comprising display means for displaying a measurement result of said capacitances of said pixels in one frame, obtained by said measurement means.

3. The test system according to claim 1, wherein said signal supply means prepares a plurality of image patterns, and may transmit, to said gate line and said data line, a control signal for displaying a designated image pattern on said liquid crystal display device.

4. A test method for a liquid crystal display device comprising the steps of:

supplying a control signal to be executed to a gate line and a data line of said liquid crystal display device;

halting, in accordance with a test start signal input, a supply of said control signal to said data line of said liquid crystal display device during a one frame interval; and measuring capacitances of pixels in one frame of said liquid crystal display device during said one frame interval.

5. The test method according to claim 4, further comprising a step of displaying a result of a measurement of said capacitances of said pixels in one frame.

6. The test method according to claim 5, wherein said step of supplying said control signal includes a step of turning on said liquid crystal display device and examining an ON state of said liquid crystal display device.

7. The test method according to claim 6, wherein a plurality of image patterns are prepared in advance and a designated image pattern is displayed on said liquid crystal display device.

* * * * *